July 20, 1926.

E. D. TILLYER

OPHTHALMIC LENS

Filed Nov. 6, 1924

1,593,198

INVENTOR
Edgar D. Tillyer.
BY
Harry H. Styll
ATTORNEY

Patented July 20, 1926.

1,593,198

UNITED STATES PATENT OFFICE.

EDGAR D. TILLYER, OF SOUTHBRIDGE, MASSACHUSETTS, ASSIGNOR TO AMERICAN OPTICAL COMPANY, OF SOUTHBRIDGE, MASSACHUSETTS, A VOLUNTARY ASSOCIATION OF MASSACHUSETTS.

OPHTHALMIC LENS.

Application filed November 6, 1924. Serial No. 748,130.

This invention relates to improvements in ophthalmic lenses, and has particular reference to bifocal lenses made of two pieces of glass, said lenses being commonly known in the art as fused bifocal lenses, and it also relates to an improved method or process of making the same.

This application is a continuation in part of my application Serial Number 631,506, filed April 12, 1923.

In general, a fused bifocal lens comprises a major blank of glass of low index of refraction, having a spherical recessed surface in one side, and a segment of glass of high index of refraction fused into the recess and the surface of the blank on the segment side is provided with a spherical curved surface to give the desired added optical power of the segment section over the rest of the blank, the surface on the other side being finished to an optical surface to give the desired prescriptive power of the lens. Such lenses possess astigmatic aberration in the segment portion due to the obliquity of the vision through the segment, which astigmatism is especially pronounced in fused bifocal lenses due to the steep curves in the recessed portion, even when the distance portion is correct.

The main object of the invention is to provide a two part fused bifocal lens which shall be substantially free from astigmatism through the reading portion of the lens, and absolutely free from such astigmatism at any one selected point within said reading portion, if so desired.

A further object is to provide means for the elimination of such astigmatism in the reading portion by adding an excess correcting power in one meridian on the segment side, and compensating on the opposite or prescription side for any error that the added correcting power may have introduced into the distance portion of the lens.

Other objects and advantages will be apparent from the following description taken in connection with the accompanying drawings, the preferred form of the invention being shown only by way of illustration.

Similar reference characters designate corresponding parts throughout the several views.

Figure 1:
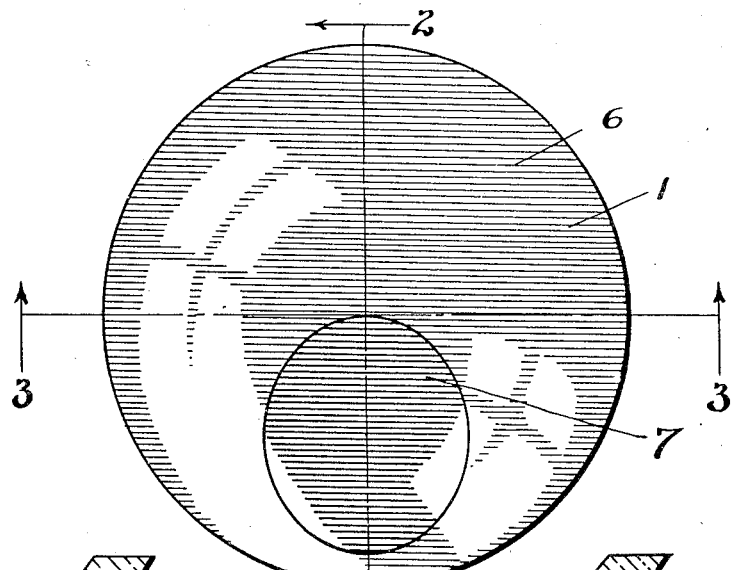
Figure 1 is a front elevation of a lens embodying the invention.

In the manufacture of the improved lens, I start exactly the same as in the manufacture of the ordinary fused bifocal lens, namely taking a blank of low index glass, 1, finishing a countersunk recess 4 therein, and fusing a segment of high index glass 5 in the recess 4, which produces the blank from which the fused bifocal lens is to be made. Hence I can start the manufacture of my lens with the ordinary commercial fused bifocal blank which is being manufactured and sold in large quantities at the present time.

Having obtained the fused blank, I next compute the astigmatic error through the segment portion for a lens of given prescription, said error being due to the oblique vision through the segment portion. These calculations are the well known prior art calculations of determining astigmatism of rays passing obliquely through a lens, which may be found in standard text books for lens calculations.

Let us assume the following example: Prescription of plus 1 diopter sphere, with a reading addition of plus 2.50 diopters. The oblique astigmatic error through the reading segment of this lens is about $\frac{1}{10}$th of a diopter by the trigonometric computation for several points, and the average value taken. In order to remove this $\frac{1}{10}$th diopter of astigmatism the easiest procedure is to first find out the effect of a 1 diopter toric cylinder on the front surface of the distance field as measured in the distance field indicated by 6, because if we know the effect of one diopter as measured in the distance field 6 we can by direct proportion obtain the actual number of diopters as measured in the distance field necessary to eliminate one-tenth diopter error in the segment. We will assume the index of the glass for the distance portion to be 1.5232, and for the reading segment 1.6165, which are the indices of the usual commercial article. It will be clear that if we put a 1 diopter toric cylinder curve on the major section 6, that it will have greater effect on the segment portion 7 because of the higher index of the glass of the segment portion, which will give the following ratio: a curve giving 1 diopter on the portion 6, will give 1.178 diopters on the segment portion 7, or an increase of 1.178 diopters less 1 diopter, which equals 0.178 diopter increase per diopter on the segment portion over that of the distance portion.

From the foregoing it will be seen that we have increased the power of the distance portion 1 diopter, and this must be compensated for on the other or prescription side of the lens by placing a minus 1 diopter toric cylinder curve on the prescription side. This will leave us 0.178 diopter increase cylinder on the segment portion 7 for each diopter of increase on the front side of the distance portion.

Now, therefore, we have to remove 0.10 diopter astigmatism from the segment portion 7, which we do as follows: We find that for each diopter of cylinder value on the distance portion we can remove 0.178 diopters cylinder from the segment portion, and we require to remove 0.10 diopter from the segment portion. Therefore, we will require 0.56 diopter toric cylinder on the segment face of the lens of opposite sign to the 0.10 diopter required to be removed from the segment with the same axis, or this might be expressed in the transposed form by the usual methods of cylinder transposition, and likewise we will require a minus 0.56 diopter toric cylinder curve on the opposite or non-segment side. In other words, the segment side must have a toric cylinder curve of 0.56 diopter on the low index portion, which will be a 0.66 diopter toric cylinder on the high index portion, and the opposite side of the lens must have a compensating curve of opposite sign. If the lens were thin this would be minus 0.56 diopter toric cylinder of the same axis. Since it is not thin we must correct for thickness by the usual methods of thickness computations, if it is appreciable, said computations being well known to those skilled in the art.

If the original prescription has a cylinder in addition to the spherical power which we have assumed, this cylinder is combined with the compensating cylinder on the side opposite the segment side by the usual methods of combining oblique cylinders, as given in any standard text book.

It will be understood that by a toric curve or surface is meant a curved surface having one curvature in one major meridian, and another curvature in the other major meridian, but one of these curves may be zero. Where we refer to a 1 diopter toric cylinder is meant that the difference in curvature in the two meridians is such as to produce an effect of 1 diopter in one meridian over the other.

The usual glass used in the production of these fused bifocals is what is commonly known as crown glass for the major portion 6, and flint glass for the segment portion 7.

It will be apparent, as indicated in Figure 1, that the shape of the segment 7, in plan view, will not be exactly round or circular, but will be slightly elliptical, the ellipse being elongated on the meridian having the weaker power, and shortened on the meridian having the stronger power.

Figures 2, 3:
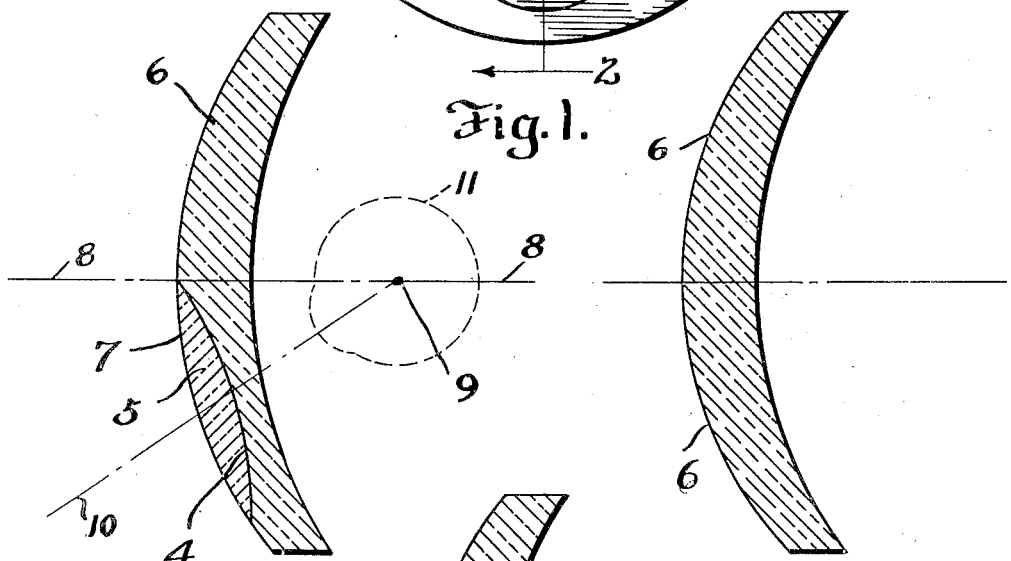
Figure 2 is a cross section on line 2—2 of Figure 1.
Figure 3 is a cross section of Figure 1 on line 3—3.
Figure 4:
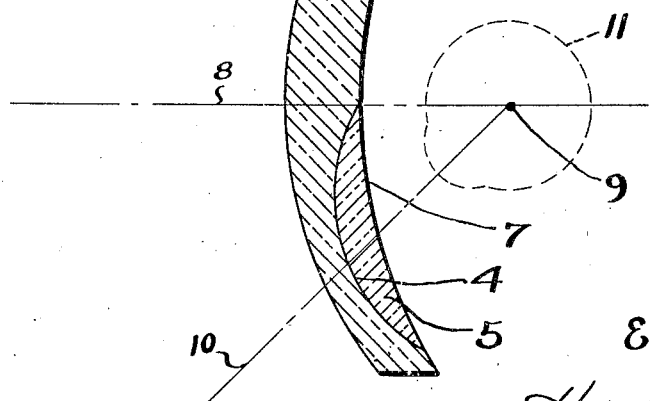
Figure 4 is a view similar to Figure 2 of a modified form of the lens showing the segment on the eye side of the lens.

Reference has been made to the vision through the segment portion being oblique. This is indicated in Figures 2 and 4. It will be noted that the segment or reading portion lies below the axial line 8, the center of the eye 9 being located on the axial line 8 at about 27 millimeters from the rear surface of the lens. It is clear that the line of vision 10 is in a descending oblique position and passes obliquely through the segment or reading portion and not normally therethrough, also obliquely through that portion of the major blank lying behind the segment, and the correction that we are referring to is the sum of all of these variations as distinguished from going through the distance portion only at a corresponding angle. It will be noted in Figure 4, where the segment is on the eye side of the lens, that the conditions are much more severe than those in Figure 2, where the segment is on the outside surface of the lens; in Figure 4 the line of direction will be more oblique than in Figure 2, particularly at the upper part of the segment 7. The eye is indicated by the dotted line 11 in Figures 2 and 4.

In Figure 3 is shown a section through the lens in the axial line in the horizontal meridian, taken on line 3—3 of Figure 1. It will be clear that this section is entirely through the distance portion of the lens and does not touch the reading portion.

From the foregoing description it will be seen that I have provided means of compensating the astigmatic error in the segment portion by adding a toric curve to one side of the lens and compensating for the added toric in the distance portion by putting a toric curve of opposite sign on the opposite side of the lens, and in this way the astigmatic error in the reading portion of any desired prescription may be determined and compensated for.

It is well known that the astigmatism in the ordinary usable powers of fused bifocal lenses is rather high; as for instance in the example we have given there is approximately ⅛th diopter error in a rather weak prescription, that is, a 1 spherical power with a 2.50 reading addition. This error increases rapidly with the increased power of the prescription.

It will be understood that in the manufacture of this bifocal no new machinery or tools are needed. As stated, the original blank is the prior art blank for the usual fused bifocal lens, and the toric cylinder curves are ground with the ordinary toric cylinder tools, which have been in use in the art for many years.

I do not limit myself to the exact details illustrated and described herein, but reserve the right to make such changes as fall within the scope of the claims without departing from the spirit of the invention.

I claim:

1. An ophthalmic lens, comprising a distance portion of one index of refraction having a spherical recess therein, a segment reading portion of different index of refraction secured in the recess, and a lens surface on the segment side of the lens, the difference of whose astigmatic surface powers on the distance portion and the segment portion is sufficient to overcome the astigmatic aberration of the segment of the reading portion, and an optical surface on the other side of the lens that will give the required prescription power and also compensate the distance portion for the change in power that has been made in it to correct the segment portion.

2. An ophthalmic lens, comprising a distance portion and a reading portion of different indices of refraction having an optical surface ground on one side with such a difference of astigmatic power between the reading portion and the distance portion that it will overcome the astigmatic aberration in the reading portion, and an optical surface on the other side having an addition in power sufficient to compensate the distance portion for the addition in power that has been made to correct the astigmatism of the reading portion, and also the required prescription power.

3. An ophthalmic lens, comprising a blank having a spherical recess in one side, a segment reading portion inserted in said recess, said segment being of a different refractive index, one side of the blank being ground to a toric surface to overcome the astigmatic aberration in the segment, and the other side being finished to an optical surface having an addition in power sufficient to compensate the addition in power of the non-segment portion to overcome the astigmatic aberration in the segment portion, and also to give the required prescription power.

4. An ophthalmic lens comprising a distance portion of low index of refraction having a spherical recess therein, a segment reading portion of high index of refraction secured in the recess, and a lens surface on the segment side of the lens, the difference of whose astigmatic powers on the distance portion and the segment portion is sufficient to overcome the oblique astigmatic aberration of the reading portion, and an optical surface on the other side of the lens that will give the required prescription power and will compensate for the additional astigmatism introduced into the distance field in correcting the reading field.

5. An ophthalmic lens of the character described, comprising a distance portion of crown glass having a spherical recess on one side below its center, a reading portion formed by a flint glass segment inserted in said recess, the segment side of the lens being ground in toric form, the difference of whose astigmatic powers on the distance portion and the segment portion is sufficient to overcome the astigmatic aberration in the reading portion, and the opposite side of the lens being finished to an optical surface to give the required prescription power and having an addition in power sufficient to neutralize the change in power to the distance portion caused by correction of the reading portion.

6. In an ophthalmic lens of the character described, a blank of crown glass forming a distance portion having a spherical recess in one side below its center, a segment of flint glass inserted in said recess and forming a reading portion, the segment side of the lens being finished in toric form to overcome the astigmatism in the reading portion, and the other side being finished in toric form of opposite sign sufficient in power to give the required prescription power and to neutralize the addition given to the distance portion to overcome the astigmatism in the reading portion.

7. An ophthalmic lens blank comprising a distance portion of one index of refraction having a spherical recess therein, a segment reading portion of different index of refraction secured in the recess, and a toric lens surface on the segment side of the blank having an excess of power in one major meridian over the power of the other major meridian equal to the astigmatic aberration of the segment reading portion and positioned to neutralize the said astigmatic aberration of the segment reading portion.

8. An ophthalmic lens blank comprising a distance portion of one index of refraction having a spherical recess therein, a segment reading portion of different index of refraction secured in the recess, and a lens surface on the segment side of the blank, the difference of whose surface powers on the distance portion in one major meridian over the other major meridian and the segment portion is equal to the astigmatic aberration of the segment reading portion, and positioned to neutralize the said astigmatic aberration of the segment reading portion.

EDGAR D. TILLYER.